United States Patent
Chi et al.

(10) Patent No.: US 7,362,267 B2
(45) Date of Patent: Apr. 22, 2008

(54) SMART ANTENNA, METHOD AND APPARATUS FOR ADAPTIVE BEAM FORMING

(75) Inventors: Lidong Chi, Shenzhen (CN); Yanwen Wang, Shenzhen (CN); Yunkuan Wang, Shenzhen (CN)

(73) Assignee: ZTE Corporation, Shenzhen (CH)

( * ) Notice: Subject to any disclaimer, the term of this patent is extended or adjusted under 35 U.S.C. 154(b) by 187 days.

(21) Appl. No.: 10/541,316

(22) PCT Filed: Dec. 31, 2002

(86) PCT No.: PCT/CN02/00947

§ 371 (c)(1),
(2), (4) Date: Nov. 4, 2005

(87) PCT Pub. No.: WO2004/059793

PCT Pub. Date: Jul. 15, 2004

(65) Prior Publication Data

US 2006/0114154 A1    Jun. 1, 2006

(51) Int. Cl.
*H01Q 3/00* (2006.01)

(52) U.S. Cl. ..................... 342/377; 342/373
(58) Field of Classification Search ........... 342/368, 342/373, 375, 377, 378, 383
See application file for complete search history.

(56) References Cited

U.S. PATENT DOCUMENTS

| | | | |
|---|---|---|---|
| 6,369,757 B1* | 4/2002 | Song et al. | 342/378 |
| 7,031,671 B2* | 4/2006 | Mottier | 455/101 |
| 2005/0159108 A1* | 7/2005 | Fletcher et al. | 455/63.4 |

FOREIGN PATENT DOCUMENTS

| | | |
|---|---|---|
| CN | 1352498 A | 6/2002 |
| KR | 2001011216 A | 2/2001 |

* cited by examiner

*Primary Examiner*—Dao Phan
(74) *Attorney, Agent, or Firm*—Foley & Lardner LLP

(57) ABSTRACT

A beam forming method for a smart antenna and smart antennas configured to employ the method, in which pre-multibeam processing and time delay aligning are implemented to array signals, and then a suboptimum weight is calculated by means of a pilot frequency symbol, and an optimum weight is iteratively calculated with the suboptimum weight as an initial value, and finally the beams are formed by means of the optimum weight.

19 Claims, 5 Drawing Sheets

SMART ANTENNA, METHOD AND APPARATUS FOR ADAPTIVE BEAM FORMING

This application is a National Stage application of PCT/CN2002/000947, filed Dec. 31, 2002. The entire contents of the aforementioned application is incorporated herein by reference.

FIELD OF THE INVENTION

The present invention relates to radio communication field, more particularly, to a technique for the adaptive beam forming of a smart antenna.

BACKGROUND OF THE INVENTION

With the rapid development of modern digital signal processing technology in recent years, continuously the processing capability of a DSP chip is enhanced and the price of the chip is reduced, so that it is possible to form antenna beams at baseband with digital technology, therefore the smart antenna technology with a key technology of an adaptive beam forming algorithm is widely used in CDMA communication.

In a CDMA communication system, accurate time delay information is required before the adaptive beam forming of a smart antenna, otherwise the result of adaptive processing will be influenced seriously due to the correlation of codes. At present, there are many beam forming algorithms for smart antennas, but the common disadvantage of them consists in that it does not solve the problem of multipath time delay. It is supposed that the time delay information is known accurately or that the time delay is known in existing adaptive beam forming algorithms for smart antennas, and this kind of algorithms relate a little detailed embodiments and structures. In the Chinese patent application with a publication number of 1235391, named "Adaptive Array Antenna Optimizing and Forming Beams in Advance for Code Division Multiple Access System", the calculation of the weight in complex number is divided into two parts, i.e. initial weight designing and operational weight processing, since this application does not solve the problem of time delay accuracy and it requires a high initial weight, the performance of the smart antenna is hardly ensured. Because it is crucial for an adaptive beam forming method to determine the multipath time delay accurately, how to search out the time delay information accurately is a problem which should be solved by the prior arts urgently.

SUMMARY OF THE INVENTION

According to one aspect of the present invention, it provides a beam forming method for a smart antenna, which comprises the steps of implementing pre-multibeam processing and time delay aligning to array signals; calculating a suboptimum weight by means of a pilot frequency symbol; iteratively calculating an optimum weight with said suboptimum weight as an initial value; forming beams by means of said optimum weight.

According to another aspect of the present invention, it provides a beam forming apparatus for a smart antenna, and the apparatus comprises: a space domain forming module for implementing beam forming to the signals received by an antenna array, and said space domain forming module further comprises a pre-multibeam time delay searching unit for implementing pre-multibeam processing and time delay aligning to array signals; a time domain processing module for obtaining the transmitted data based on the signals beam-formed by said space domain forming module; and a re-spreading and iterating module for generating a reference signal basing on the data information acquired by said time domain matched filtering module, calculating an iteration error and feeding it back to said space domain beam forming module.

According to another aspect of the present invention, it provides a smart antenna, which comprises the beam forming apparatus mentioned above and an antenna array composed by a number of elements.

BRIEF DESCRIPTION OF THE DRAWINGS

The above-mentioned or other advantages, objects and features of the present will be clearer by describing the preferred embodiments of the invention with reference to the drawings.

DETAILED DESCRIPTION OF THE INVENTION

An embodiment of the present invention will now be described with reference to the drawings.

Figure 1:
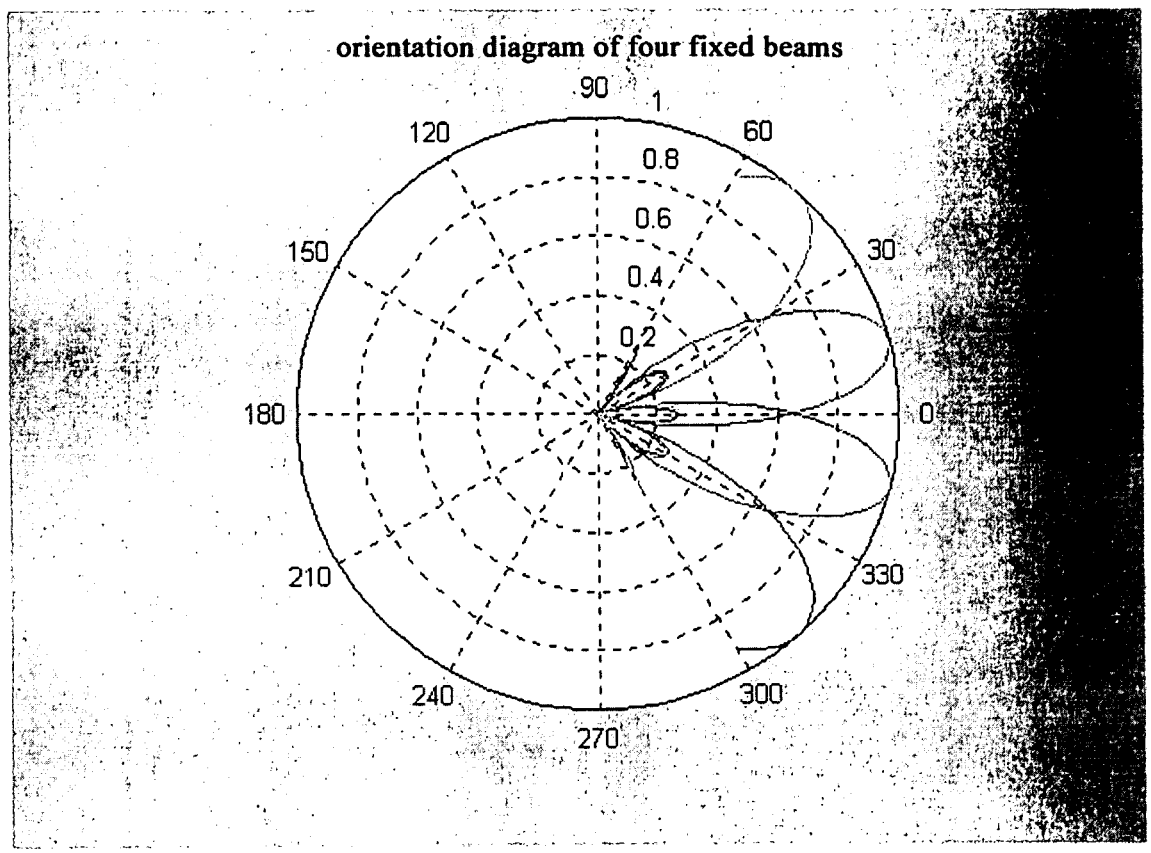
FIG. 1 is an orientation diagram of the four narrow beams of a cover sector generated by the pre-multibeam processing according to an embodiment of the present invention.

FIG. 1 is a beam orientation diagram, in which shown that four beams can magnificently cover a sector of 120° in a range of −60°~60°, and the side lobes are low.

Figure 2A:
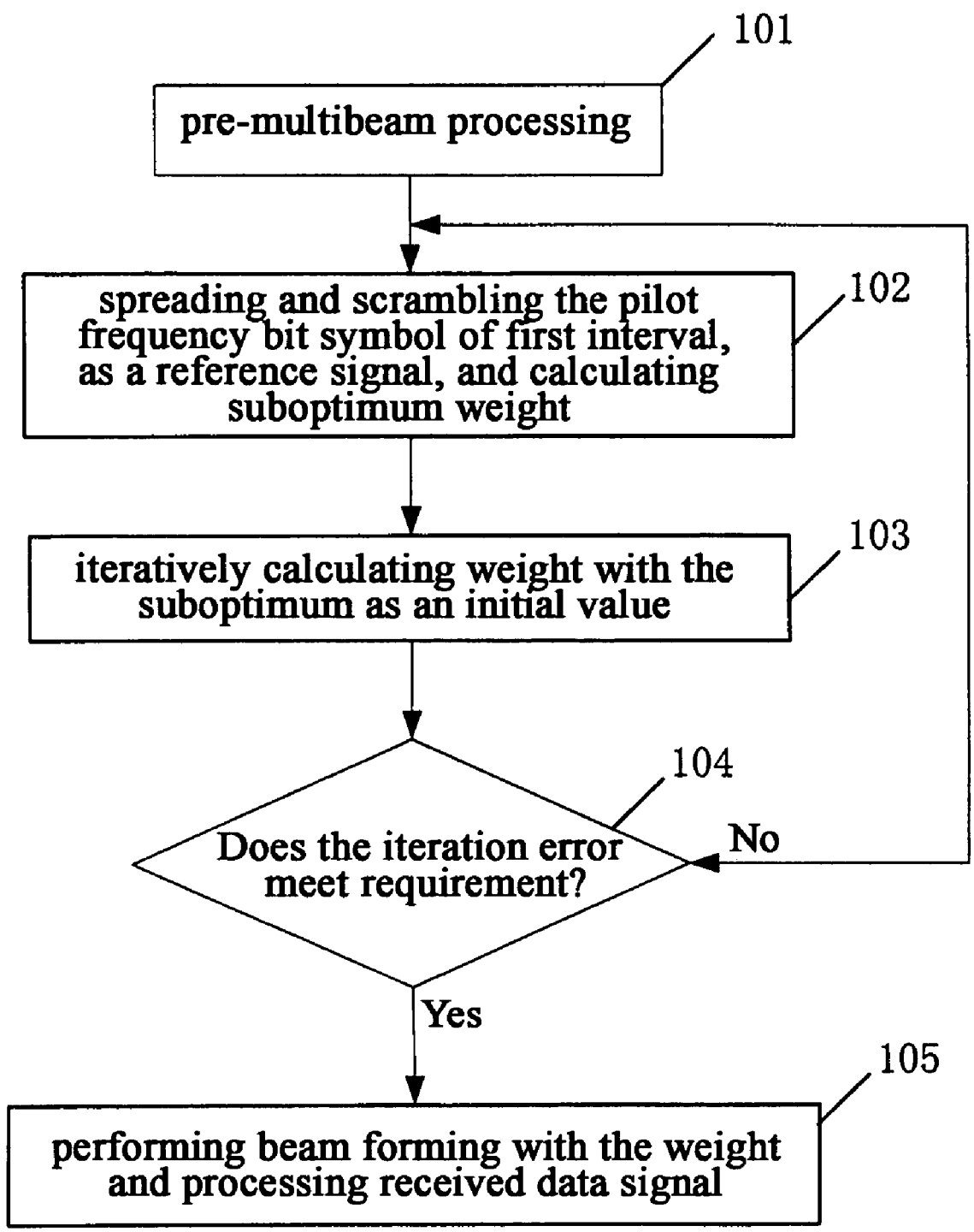
FIG. 2A is a flow chart showing the beam forming method according to a preferred embodiment of the present invention.

FIG. 2A is a flow chart showing the beam forming method according to a preferred embodiment of the present invention. As shown in FIG. 2A, in Step 101 firstly, in order to obtain the accurate time delays of respective multipathes before the adaptive beam forming, so as to ensure the beam forming of the smart antenna to be more reliable, the received arrays are implemented pre-multibeam processing in parallel simultaneously during the process of calculating the adaptive weight to supply an array received signal with aligned time delays to the adaptive weight calculation in real time.

More particularly, the processing includes generating a number of fixed narrow beams covering the sector, for example, in an embodiment, said sector is of 120° and four fixed narrow beams are generated herein (as shown in FIG. 1). The beam with maximal energy value can be found by implementing beam forming to the data received by the array and implementing time delay searching to the generated beam domain signal using said fixed narrow beams, and the time delay value in this beam is the time delay value of the array received signal. The data received by the arrays is implementing time delay aligning based on this time delay value and the array received vector of the information bits after the time delay aligning is represented by X.

In different embodiments of the present invention, all the directions of arrival of mobile stations in the sector can be contained within the pre-multibeam by adjusting the size of the sector and the coverage area according to requirements. The number of the beams and the beam width can also be adjusted according to requirements. If the direction of arrival of a mobile station lies between two beams exactly, these two beams can be incorporated into one wide beam to ensure effective beam coverage.

The pre-multibeam processing of the present invention can supply accurate time delay information to the adaptive calculation method of the smart antenna, and further ensure the accuracy and the reliability of the adaptive algorithm, and it is proved via experiments that the combination of the pre-multibeam processing and the adaptive algorithm in the present invention improves the signal-to-noise ratio of the received signals of the smart antenna greatly and achieves the superior performance of the smart antenna well, compared to the result of the simple adaptive algorithm without the pre-multibeam processing.

In Step 102 subsequently, the suboptimum weight is calculated. During all the pilot frequency bits of the first interval of the current frame, a known pilot frequency symbol is regarded as a reference signal, and a correlation matrix is calculated based on the reference signal after performing spread spectrum and scramble and the array received vectors after aligning the time delays, and then the matrix serves as the suboptimum weight. Wherein, the signal after re-spreading and scrambling during the pilot frequency bits is $r=b_{pilot} \cdot CS$, and the suboptimum weight is $W=E[Xr^*]$, wherein, $b_{pilot}$ is the known pilot frequency symbol, CS is the resulted sequence of the multiplication between spread frequency codes and scramble codes. In this Step, a known pilot frequency bit is regarded as a reference signal, and the optimum weight is calculated based on the reference signal after performing spreading and scrambling and the array received vectors after the time delay aligning, and then the optimum weight serves as the initial value for post minimum mean square error iteration, since this initial value is closer to the ideal weight, the convergence rate will be improved greatly (It will be converged after 3-4 symbol bits sometimes), which meets the requirement for the real time processing of a communication system.

Then in Step 103, the suboptimum weight is regarded as an initial value and the weight is calculated iteratively. This Step will now be described in detail with reference to FIG. 2B.

Figure 2B:
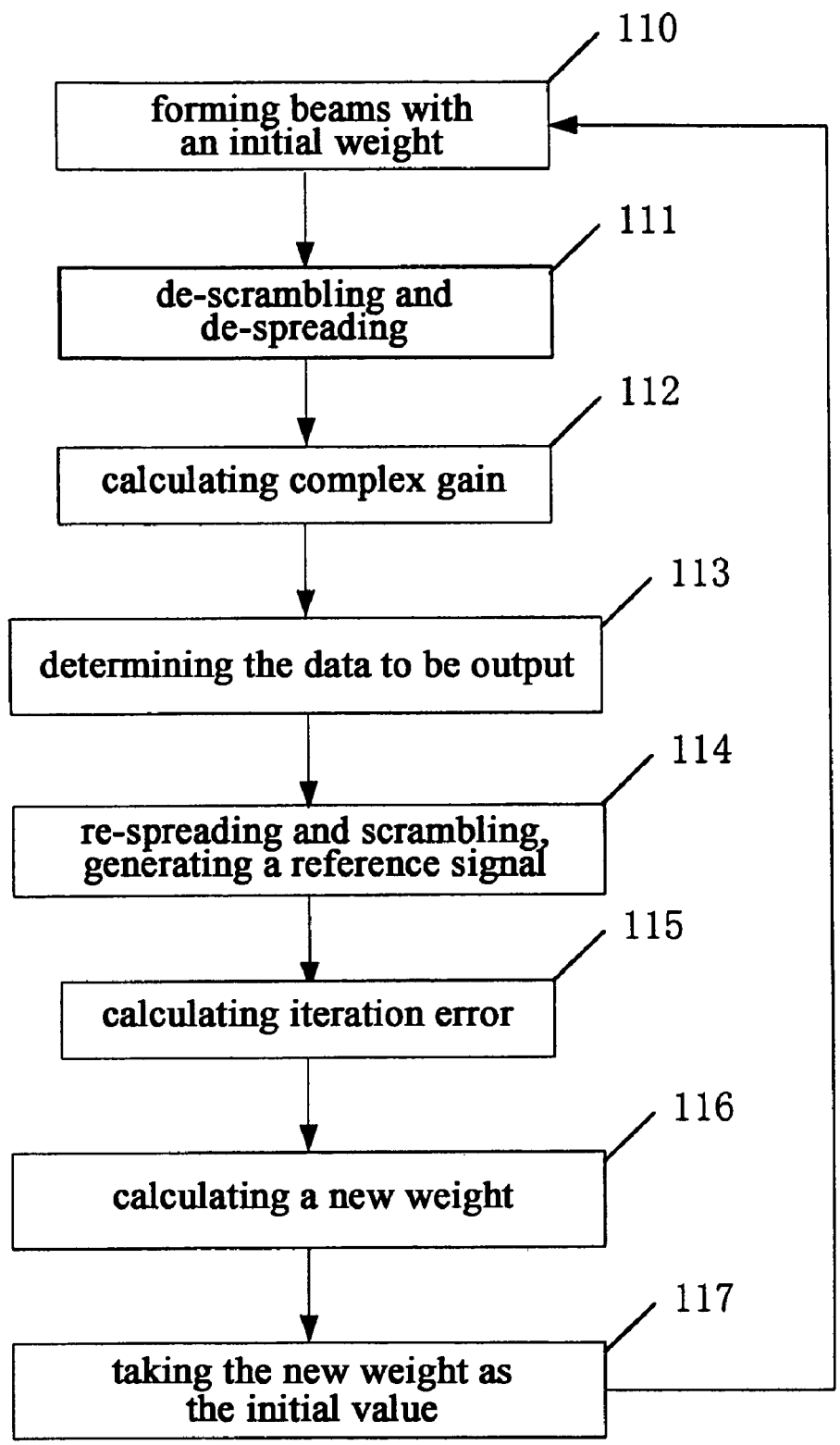
FIG. 2B is a detailed flow chart showing the iteration calculation of the weight in the embodiment shown in FIG. 2.

FIG. 2B is a detailed flow chart showing the iteration calculation of the weight in the embodiment shown in FIG. 2. As shown in FIG. 2B, firstly in Step 110, beams are formed with an initial weight, and it supposes that the signal after the beam forming is Y, then $Y=W \times X$, wherein W is a weight.

Next in Step 111, the signal after the beam forming is de-spread and descrambled, $$v(j) = \text{Imag}\left(\sum_{k=1+jK}^{(j+1)K} y(k)c(k)\right),$$

wherein j represents the $j^{th}$ information symbol, K represents a spread factor, Imag( ) represents to calculate the imaginary part.

In Step 112, a complex gain of the $l^{th}$ piece of multipath incorporated by RAKE is estimated based on the result of the de-spreading and the descrambling with the pilot frequency section, $$G_c(l) = \frac{1}{q}\sum_{m=1}^{q}[b_m \cdot v(m)],$$

wherein q is the number of pilot frequency bits, and $b_m$ is a known pilot frequency bit.

In Step 113, the transmitted control information is determined, $b=\text{sign}(\text{Im ag}(v)G_c^*(l))$.

In Step 113, the determined control information is spread, $d=b \cdot C$ and then the control information is descrambled, $r=d \times S$, it should be noted that if it is during a pilot frequency bit, a known pilot frequency bit $b=b_{pilot}$ can be used to calculate r directly (without Step 113). Thus the reference signal r is obtained.

In Step 115, the iteration error is calculated, $E=r-Y$, r is the reference signal calculated before, Y is the signal of the up-to-date beam forming.

In Step 116, a new weight is calculated by a iteration formula: $W_{i+1}=W_i+\mu \cdot X \times E^H$, wherein, $W_i$ is the weight calculated by last step or by the iteration; $\mu$ is the step length of the iteration, which can be 0.1 or 0.01; E is the error matrix calculated before, $E^H$ is its conjugate transpose.

Then in Step 117, the newly calculated weight is regards as an initial weight, and it turns back to Step 110.

In one embodiment of the present invention, the iterative calculation mentioned above is implemented at each interval of one frame. In other preferred embodiments, under the condition that the accuracy requirement can be achieved, the signal data of the corresponding interval is processed smartly by taking the optimum weight for the first interval in the frame obtained through the above-mentioned method as the optimum weight for all the intervals in the frame, or taking the optimum weight for one random interval in the frame as the optimum weight for the latter intervals, which can further reduce the calculation amount of the weight iteration.

Back to FIG. 2A now, after the iterative calculation of weight (Step 103), said process comes to Step 104, in which the iteration error is determined whether to meet the requirement. According to one embodiment of the present invention, the determination can be accomplished by determining whether the mean square value of the error to be within a predetermined threshold. If the requirement can not be achieved, Step 102, 103 will be repeated until the mean square deviation is within the predetermined threshold. If the requirement can be achieved, it goes forward to Step 105, then the new weight is saved as the optimum weight of the interval, and it will be used to perform the beam forming of the received signal, descramble and de-spread the I channel data of the uplink channel, accomplish the information receiving and account the output signal-to-noise ratio.

It can be seen from above description that the beam forming method of a smart antenna according to the embodiment of the present invention avoids the multiplication between large matrixes and matrix inversion and replaces them by simple addition and multiplication by adopting minimum mean square error iteration, so as to reduce the difficulty for hardware implement and make it easier to be performed.

Figure 3:
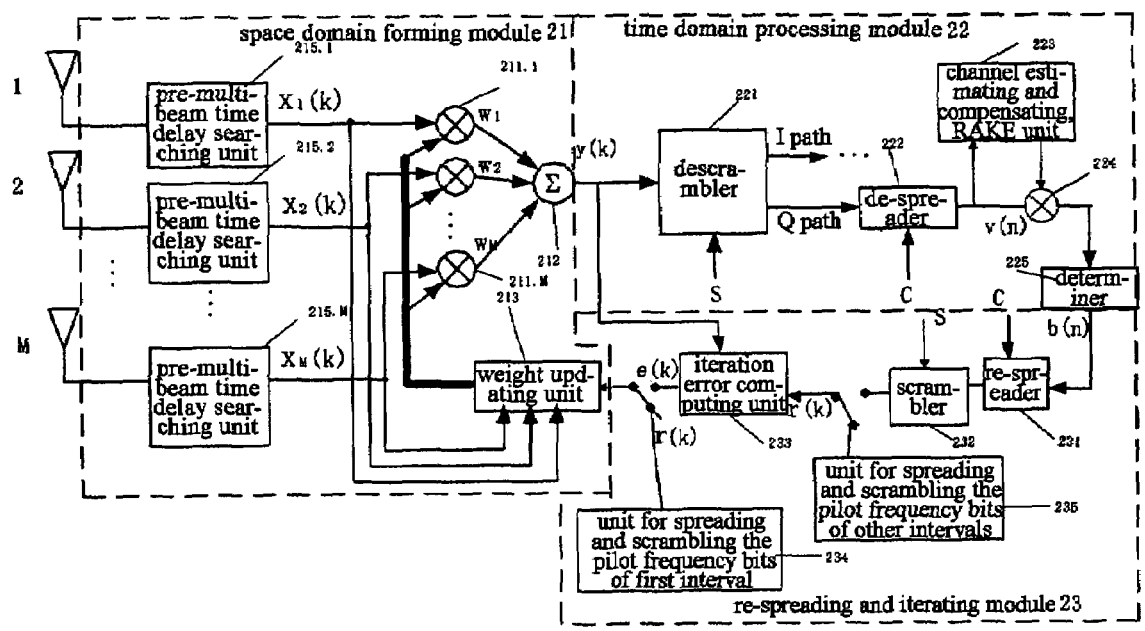
FIG. 3 is a block diagram showing the construction of the smart antenna according to a preferred embodiment of the present invention.

FIG. 3 is a block diagram showing the construction of the smart antenna according to a preferred embodiment of the present invention. As shown in FIG. 3, the smart antenna according to the embodiment comprises: an antenna array composed by a number of elements (1-M), a space domain forming module 21, a time domain processing module 22 and a re-spreading and iterating module 23. Each said antenna element (1-M) respectively comprises its antenna front end (not shown in the fig.) for receiving radio signals and converting them into received signals $X=[x_1, x_2, \ldots x_M]$, which is known by those skilled in the art.

At same time, the space domain forming module 21, the time domain processing module 22 and the re-spreading and iterating module 23 also compose the beam forming apparatus for a smart antenna according to the embodiment of the present invention. The smart antenna and its beam forming apparatus according to the embodiment of the present invention will now be described in detail with reference to the drawings.

The space domain forming module 21 is connected to each element of the antenna array (1-M), so as to implement space domain processing and beam forming to the received signal $X=[x_1, x_2, \ldots x_M]$ of the antenna array. The space domain forming module 21 comprises: pre-multibeam time delay searching units 215.1-215.M, each of which is connected to an antenna element respectively, a weight updating unit 213, multipliers 211.1-211.M and an adder 212.

The pre-multibeam time delay searching unit 215 generates several fixed narrow beams (as shown in FIG. 1), and forms array received signals using these beams respectively to obtain beam signals, during the operation period. Then it implements time delay searching to the beam signals, selects the beam with the highest energy value, records the time delay value of this beam as the path time delay of the array received signals, and implements time delay aligning to the array received signals.

After the time delay aligning, the aligned array received signals are transmitted to the corresponding multiplier (211.1-211.M), respectively. These multipliers perform their multiply operations respectively based on the corresponding weights $w_1, w_2, \ldots, w_M$ provided by the weight updating unit 213. The results of these multiply operations are summed in the adder 212 and output to the time domain processing module 22 as the result of beam forming.

The weight updating unit 213 calculates weights iteratively by means of the minimum mean square error rule and based on the error information sent from the re-spreading and iterating module 23 or the signal spread and scrambled during the pilot frequency bits of the first interval which services as the reference signal for calculating the suboptimum weight, then the unit assigns the calculated weights to the corresponding multipliers (211.2-211.M).

The time domain processing module 22 comprises: a descrambler 221, a de-spreader 222, a channel estimating and compensating RAKE unit (223, 224) and a determiner 225. The descrambler 221 and the de-spreader 222 are used to descramble and de-spread the signal which has been implemented the beam forming. The channel estimating and compensating RAKE unit 223 is used to process the descrambled data, to reduce the influence due to channels and to implement RAKE incorporating to the signals of multiple paths. And the determiner 225 is used to determine the data bits to be output from the signal after the RAKE incorporating.

The re-spreading and iterating module 23 mainly comprises: a re-spreader 231, a scrambler 232 and an iteration error computing unit 233. The re-spreader 231 and the scrambler 232 re-spread and scramble the determined data output from the time domain processing module 22, so as to generate an iteration reference signal r. The iteration error computing unit 233 then calculates an iteration error E based on the calculated iteration reference signal and the received signal Y is beam-formed by the space domain forming module 21. The iteration error computing unit 233 further transmits the iteration error E to the weight updating unit 213 of the space domain forming module 21. In addition, the re-spreading and iterating module 23 further comprises a unit 234 for spreading and scrambling the pilot frequency bits of the first interval and a unit 235 for spreading and scrambling the pilot frequency bits of the other intervals as reference signals.

The operation of the beam forming apparatus according to this embodiment of the present invention will now be described.

First of all, the time delay information is searched by the pre-multibeam time delay searching unit 215 and then the array received signals are implemented time delay aligning so as to be baseband received signals $[X_1-X_M]$. Next, the baseband signals will be processed.

During all the pilot frequency bits of the first interval, the signals provided by the unit 234 which are spread and scrambled during the known pilot frequency bits and service as reference signals, together with the baseband signals $[X_1-X_M]$ which have been implemented time delay aligned are used to calculated a cross correlation matrix, so as to calculate the suboptimum weight until the pilot frequency bits of the first interval end. The suboptimum weight at the time when the pilot frequency bits of the first interval end is input to the adder 211, and the beam forming signals of each element are incorporated into one signal by the adder 212.

Then the signal will be divided into two signals, the one is input to the iteration error computing module 233 of the re-spreading and iterating module 23 as the minuend vector for the error computing, the other is input to the descrambler 221 of the time domain processing module 22. The Q channel data of the descrambled data then enters the de-spreader 222; as a result, the de-spread data has the unit of bit and can be processed by the channel estimating and compensating RAKE unit 223, 224 to reduce the influence due to the channels.

The data processed by the determiner 225 are symbol bits of 1, −1 . . . , and input to the re-spreading and iterating module 23. When the current moment is within the information bits, the symbol bits input from the time domain processing module 22 are input to the iteration error computing module 233 via the re-spreader 231 and the scrambler 232, and then minus the signal previously input from the adder 212 to obtain an error signal which will be input to the weight updating module 213 of the space domain beam forming module 21. When the current moment is within the pilot frequency bits of other intervals, the re-spread and scrambled signal of a known pilot frequency bit provided by the unit 235 serves as one input of the iteration error computing module 233 and minuses the signal previously input from the adder 212 to obtain an error signal which will be input to the weight updating module 213 of the space domain beam forming module 21.

The reference signal input to the weight updating unit 213 and the aligned received signals $[X_1-X_M]$ are iterated based on the minimum mean square error rule to calculate the optimum weight. In detail, an iteration formula is adopted:

$W_{i+1}=W_i+\mu \cdot X \times E^H$, wherein, $W_i$ is the weight calculated or iterated in last step; $\mu$ is the step length of the iteration; E is the error calculated by the iteration error computing module 233; and $E^H$ is the conjugate transpose of E.

If the iteration error which has been implemented beam forming with this weight (the error is calculated by the iteration error computing module 233) meets requirement, the data of the beam forming will be implemented descrambling, de-spreading, channel estimating and compensating and RAKE incorporating, and then it will be output.

All the components composing the beam forming apparatus of the smart antenna according to the embodiment of the present invention can be hardware modules or software modules, and these modules can be integrated into a specific chip or FPGA, also part of them can be implemented by software in DSP.

Figure 4:
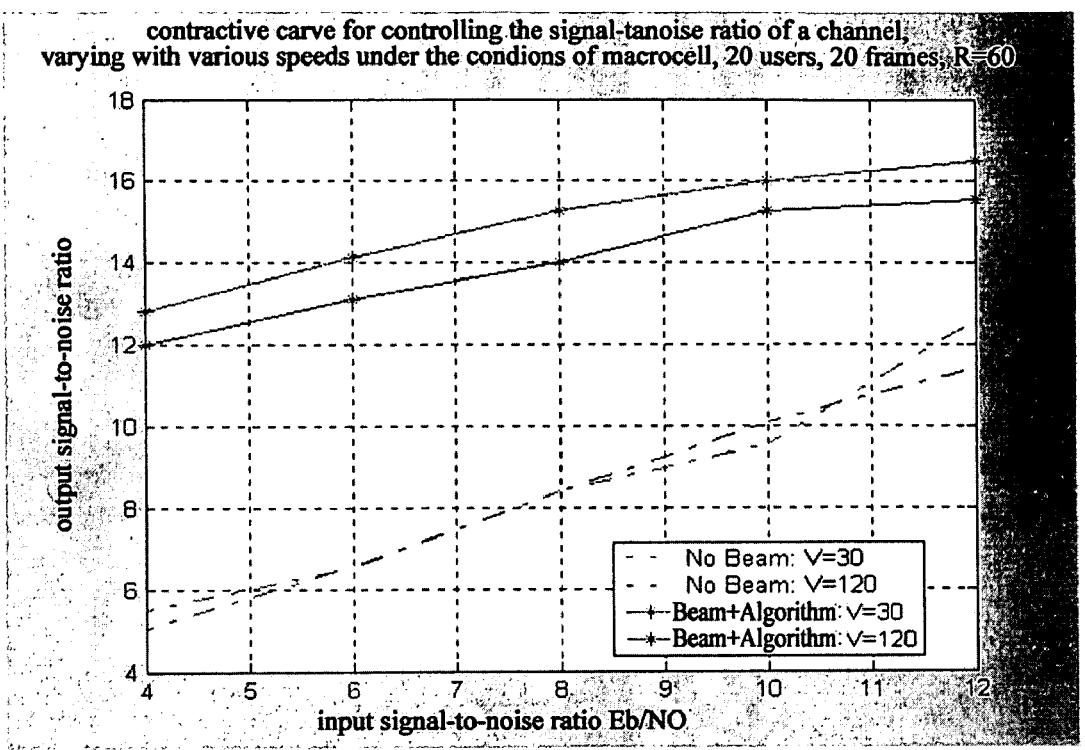
FIG. 4 is a curve showing the contraction between the output signal-to-noise ratios of the structure with the pre-multibeam processing and of the structure without the pre-multibeam processing of the present invention.

FIG. 4 is a curve showing the simulation contraction between the output signal-to-noise ratios before and after the adaptive beam algorithm of the present invention performing the pre-multibeam. The abscissa in FIG. 4 represents the input signal-to-noise ratio, Eb/N0, with a variation range of 4-12 dB. The ordinate represents the output signal-to-noise ratio. Both the interval units of the abscissa and the ordinate are 2 dB. The simulation is under the conditions of a macrocell with 20 users, a data length of 20 frames and a symbol rate of 60 kbps, in this figure, "NO Beam" represents the adaptive beam forming method without pre-multibeam processing of the prior art, and "Beam+Algorithm" represents the adaptive beam forming method of the present invention, which uses the pre-multibeam and the de-spreading and re-spreading multi-objective array assisted by pilot frequency bits and based on the minimum mean square error rule. V represents the moving speed, with a unit of kmph. As shown in the figure, when the input signal-to-noise ratio is 4 dB and the speed of the mobile station is 30 kmph, the output signal-to-noise ratio obtained through the present invention is close to 13 dB, while the output signal-to-noise ratio obtained through the method without pre-multibeam processing is about 5.8 dB, and the difference between them is about 7.2 dB, likewise, when the input signal-to-noise ratio is 6, 8, 10 and 12 dB, it has similar results, so the method of the present invention improves the output signal-to-noise ratio greatly, compared to the adaptive method without pre-multibeam processing of the prior art.

Figure 5:
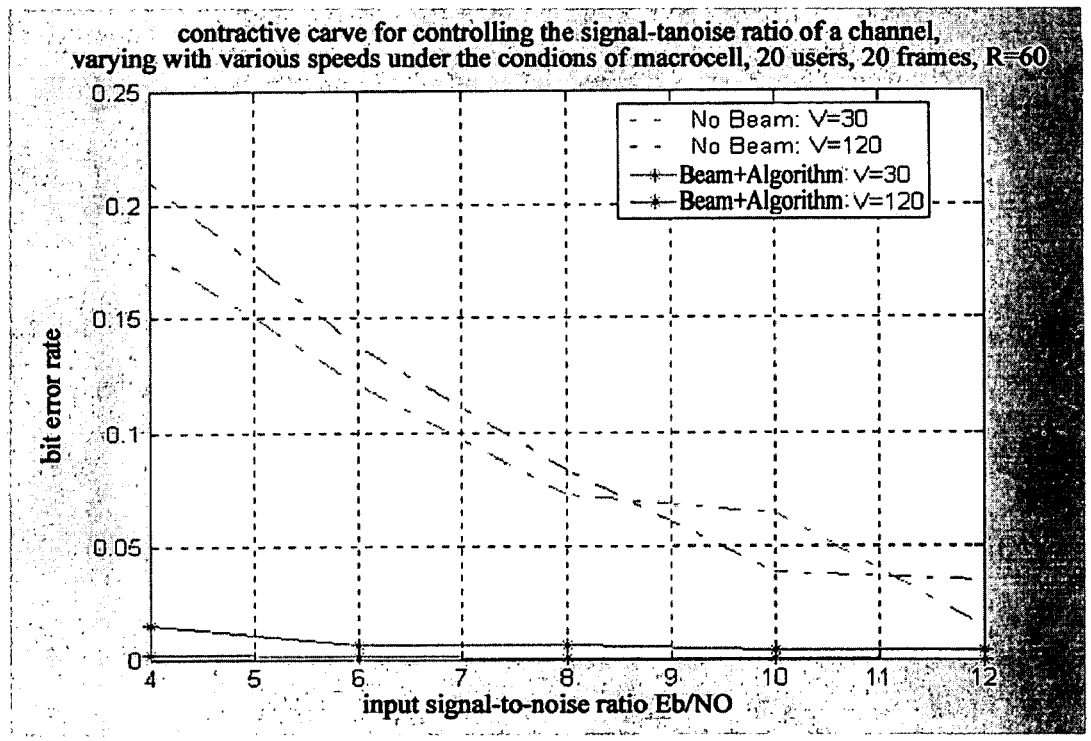
FIG. 5 is a curve showing the contraction between the output bit error rates of the structure with the pre-multibeam processing and of the structure without the pre-multibeam processing of the present invention.

The solid lines and the dashed lines in FIG. 5 represent the bit error rates of the signals received through the methods and the structures of the prior art and the present invention respectively. Similarly, it can be seen from FIG. 5 that the output bit error rate will be reduced greatly by using the method and the structure of the present invention, compared to the prior art.

Although the present invention is described in detail with some example embodiments of the present invention hereinbefore, the embodiments mentioned above are not exhaustive, and various advantages and modifications may be achieved without departing from the spirit or scope of the present invention by those skilled in the art. For example, although the embodiments mentioned above are aimed to WCDMA systems, those skilled in the art should understand that they are also suitable for other systems which are on the basis of CDMA. Accordingly, the invention is not limited to the specific details and representative embodiments shown and described herein, and the scope of the present invention is only defined by the appended claims.

The invention claimed is:

1. A beam forming method for a smart antenna, which comprises:

implementing pre-multibeam processing and time delay aligning to array signals;

calculating a suboptimum weight by means of a pilot frequency symbol;

iteratively calculating an optimum weight using said suboptimum weight as an initial weight;

forming a beam using said optimum weight.

2. The beam forming method for a smart antenna according to claim 1, wherein, said step of implementing pre-multibeam processing to array signals comprises:

generating a number of fixed beams covering a sector, and implementing beam forming to data received by an array, using of said fixed beams;

implementing beam time delay searching to the generated beam domain signals, selecting the maximum beam of each multiple paths, and aligning the array data using the time delay value of this beam.

3. The beam forming method for a smart antenna according to claim 2, wherein, the coverage area of the beam and the amount and the width of the beam can be adjusted with the size of the sector to ensure all the directions of arrival of the mobile stations in the sector are included within said pre-multibeam.

4. The beam forming method for a smart antenna according to claim 1, wherein, said step of calculating the suboptimum weight comprises:

spreading and scrambling the known pilot frequency bits of the first interval of a current frame, as a reference signal;

based on the minimum mean square error rule, calculating the approximate solution of the correlation matrix of said reference signal and the array received signals after time delay aligning, as the suboptimum weight.

5. The beam forming method for a smart antenna according to claim 1, wherein, said step of iteratively calculating the optimum weight comprises:

forming beams for the array received signals after time delay aligning, using the initial weight;

implementing descrambling and de-spreading to the received signals after beam forming, and determining control information;

re-spreading and scrambling the determined control information, as an iteration reference signal;

calculating iteration error using the iteration reference signal and the received signals after beam forming;

calculating a new weight;

iterating based on the new weight as an initial weight.

6. The beam forming method for a smart antenna according to claim 5, wherein, when calculating the new weight, an iteration formula $W_{i+1}=W_i+\mu \cdot X \times E^H$ is used, wherein, Wi is the weight calculated by last iteration, $\mu$ is the step length of the iteration, E is the iteration error, EH is its conjugate transpose, r is the iteration reference signal, Y is the received signals after beam forming.

7. The beam forming method for a smart antenna according to claim 5, wherein, in said step of determining, the information of a known pilot frequency bit serves as the determined output during the pilot frequency bit.

8. The beam forming method for a smart antenna according to claim 5, wherein, before the step of forming beams using said optimum weight, said method further comprises:

determining whether the iteration error meets requirement;

if the iteration error does not meet requirement, repeating said step of calculating the suboptimum weight and said step of iteratively calculating the optimum weight.

9. The beam forming method for a smart antenna according to claim 8, wherein, said step of determining comprises:
calculating the mean square value of the iteration error;
if the calculated mean square value of the iteration error is larger than a predetermined threshold, determining that the iteration error does not meet requirement, otherwise determining that the iteration error meets requirement.

10. The beam forming method for a smart antenna according to claim 8, wherein, the optimum weight obtained in the first interval of each frame serves as the optimum weight of the whole frame to process the signals of all the intervals of the frame.

11. A beam forming apparatus for a smart antenna, which comprises:
a space domain forming module for implementing beam forming to signals received by an antenna array, said space domain forming module further comprising a pre-multibeam time delay searching unit for implementing pre-multibeam processing and time delay aligning to the array signals;
a time domain processing module for obtaining transmitted data based on the signals beam-formed by said space domain forming module; and
a re-spreading and iterating module for generating a reference signal based on information acquired by said time domain matched filtering module, calculating an iteration error and feeding it back to said space domain beam forming module.

12. The beam forming apparatus according to claim 11, wherein said space domain forming module further comprises:
a weight updating unit for calculating weights used for beam forming using the iteration error fed back from the re-spreading and iterating module;
multipliers for multiplying the corresponding weights calculated the weight updating unit and the received signals of the elements of the corresponding antenna array; and
an adder for adding the output of the multipliers.

13. The beam forming apparatus according to claim 11, wherein, said time domain processing module comprises:
a descrambling and de-spreading unit for descrambling and de-spreading the signals beam-formed by the space domain forming module;
a RAKE incorporating unit for incorporating the signals of multiple paths; and
a determiner for determining the data to be transmitted from the signals after the RAKE incorporating.

14. The beam forming apparatus according to claim 11, wherein said re-spreading and iterating module comprises:
a re-spreading and scrambling unit for re-spreading and scrambling the transmitted data obtained by said time domain processing module, as an iteration reference signal;
an iteration error computing unit for calculating the iteration error based on the iteration reference signal from said re-spreading and scrambling unit and the received signals beam-formed by said space domain forming module.

15. The beam forming apparatus according to claim 14, wherein, said weight updating unit of the space domain forming module iteratively calculates an optimum weight using the iteration error calculated by the iteration error computing unit.

16. The beam forming apparatus according to claim 15, wherein, said weight updating unit of the space domain forming module calculates the cross correlation matrix of the spreading and scrambling signals of the known pilot frequency bit and the received pilot frequency range signals, based on the minimum mean square error rule to obtain a suboptimum weight, as the initial value of iteration calculating.

17. The beam forming apparatus according to claim 16, wherein, said weight updating unit re-calculates the suboptimum weight when it is determined that said iteration error does not meet requirement.

18. The beam forming apparatus according to claim 14, wherein, said iteration error computing unit regards the signal spread and scrambled using a known pilot frequency bit as the iteration reference signal during pilot frequency bits.

19. A smart antenna, which comprises an antenna array composed by elements and the beam forming apparatus of claim 11.

* * * * *